(12) United States Patent
Crowley et al.

(10) Patent No.: US 12,024,126 B2
(45) Date of Patent: *Jul. 2, 2024

(54) LADDER SYSTEMS, AGRICULTURAL VEHICLES, AND RELATED METHODS

(71) Applicant: AGCO Corporation, Duluth, GA (US)

(72) Inventors: Mark Aron Crowley, Spirit Lake, IA (US); Spencer Dale Johnson, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,608

(22) Filed: Feb. 20, 2023

(65) Prior Publication Data

US 2023/0202397 A1    Jun. 29, 2023

Related U.S. Application Data

(63) Continuation of application No. 17/660,581, filed on Apr. 25, 2022, now Pat. No. 11,634,082, which is a continuation of application No. 16/938,708, filed on Jul. 24, 2020, now Pat. No. 11,332,076.

(60) Provisional application No. 62/878,957, filed on Jul. 26, 2019.

(51) Int. Cl.
  *B60R 3/02*   (2006.01)
  *A01B 76/00*  (2006.01)

(52) U.S. Cl.
  CPC ............... *B60R 3/02* (2013.01); *A01B 76/00* (2013.01)

(58) Field of Classification Search
  CPC .................................. B60R 3/02; A01B 76/00
  See application file for complete search history.

(56) References Cited

U.S. PATENT DOCUMENTS

| | | | | |
|---|---|---|---|---|
| 7,448,637 | B2* | 11/2008 | Parker | E06C 1/005 280/166 |
| 2009/0152046 | A1* | 6/2009 | Stewart | B60R 3/02 182/127 |
| 2017/0188513 | A1* | 7/2017 | Kluver, III | A01D 41/1261 |
| 2018/0178730 | A1* | 6/2018 | Knox | E06C 5/04 |

* cited by examiner

*Primary Examiner* — Bryan A Evans (57) ABSTRACT

A ladder system includes a rail, a ladder bracket supported by and configured to slide along the first rail and the second rail, a ladder coupled to the ladder bracket and configured to rotate with respect to the ladder bracket between a lowered position and a storage position, and a bumper coupled to the ladder and configured to apply a force to a bumper stop when the ladder is in the lowered position to keep the ladder bracket from sliding along the rail. An agricultural vehicle includes a chassis supported by a plurality of wheels, and a ladder system carried by the chassis. Related methods are also disclosed.

20 Claims, 9 Drawing Sheets

LADDER SYSTEMS, AGRICULTURAL VEHICLES, AND RELATED METHODS

CROSS-REFERENCE TO RELATED APPLICATION

This application is a continuation of U.S. patent application Ser. No. 17/660,581, filed Apr. 25, 2022, now U.S. Pat. No. 11,634,082, which is a continuation of U.S. patent application Ser. No. 16/938,708, filed Jul. 24, 2020, now U.S. Pat. No. 11,332,076, which claims the benefit of the filing date of U.S. Provisional Patent Application 62/878,957, filed Jul. 26, 2019, the entire disclosures of each of which are incorporated herein by reference.

FIELD

Embodiments of the present disclosure relate to ladder systems and mobile machines, such as self-propelled agricultural machines and similar vehicles. More particularly, embodiments relate to a mobile machine onto which an operator may need to climb in the field to make adjustments, repairs, or inspections.

BACKGROUND

Some agricultural vehicles are configured to be operated in fields among row crops. Application machines such as self-propelled sprayers, for example, may have wheels configured to pass between crop rows and a spray boom that extends outwardly from the vehicle to spray the crops as the machine travels through the field. In order to avoid damaging the crops as the vehicle moves through the field, the vehicle should have sufficient ground clearance (the distance between the vehicle body and the surface over which it moves) to clear the crops.

While a standard height agricultural vehicle may be used to process short crops, such as early stage corn or the like, difficulties arise when processing taller crops, such as mature corn, that are taller than the ground clearance of a standard vehicle. For such crops, high-clearance vehicles may be used. While high-clearance vehicles provide sufficient clearance to pass over the top of taller crops, it is typically necessary for an operator or a technician to use a ladder to access the cab and other parts of the vehicle. The ladder is conventionally attached to the high-clearance vehicle, and may be folded or detached when not in use. If the operator fails to fold up or detach the ladder before moving the vehicle, the ladder, the vehicle, and/or the field may be damaged.

BRIEF SUMMARY

In some embodiments, a ladder system includes a first rail, a second rail parallel to the first rail, a ladder bracket supported by and configured to slide along the first rail and the second rail, a ladder coupled to the ladder bracket and configured to rotate with respect to the ladder bracket between a lowered position and a storage position, and an air spring coupling the ladder to the ladder bracket and configured to apply a force to the ladder when the ladder is in the lowered position to keep the ladder in the lowered position.

An agricultural vehicle may include a chassis supported by a plurality of wheels, and a ladder system carried by the chassis.

Certain embodiments include a method of moving a ladder coupled to a ladder bracket configured to slide along a first rail and a second rail of an agricultural vehicle. The method includes rotating the ladder with respect to the ladder bracket to overcome a force of an air spring on the ladder and to cause a bumper to separate from the second rail, applying an upward force from the air spring to the ladder to direct the ladder toward a storage position, and transporting the agricultural vehicle.

In other embodiments, a ladder system includes a rail, a bumper stop below the rail, a ladder bracket supported by and configured to slide along the rail, a ladder coupled to the ladder bracket and configured to rotate with respect to the ladder bracket between a lowered position and a storage position, a bumper coupled to the ladder, and an air spring coupling the ladder to the ladder bracket and configured to push the bumper against the bumper stop when the ladder is in the lowered position.

Other embodiments include a method of moving a ladder coupled to a ladder bracket configured to slide along a first rail and a second rail of an agricultural vehicle. The method includes disengaging a retaining pin to enable the ladder to rotate with respect to the ladder bracket, rotating the ladder with respect to the ladder bracket to overcome a force of an air spring on the ladder and to cause a bumper to separate from the second rail, sliding the ladder bracket along the first rail and the second rail, applying an upward force from the air spring to the ladder to direct the ladder toward a storage position, engaging the retaining pin to retain the ladder in the storage position, transporting the agricultural vehicle, disengaging the retaining pin from the ladder, applying a downward force against the air spring to direct the ladder toward a lowered position, sliding the ladder bracket along the first rail and the second rail, rotating the ladder downward with respect to the ladder bracket to overcome a force of the air spring on the ladder and to cause the bumper to contact the second rail, and engaging the retaining pin with the ladder and the ladder bracket.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments of the disclosure when read in conjunction with the accompanying drawings, in which:

DETAILED DESCRIPTION

All references cited herein are incorporated herein in their entireties. If there is a conflict between definitions herein and in an incorporated reference, the definition herein shall control.

The illustrations presented herein are not actual views of any machine or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Figure 1:
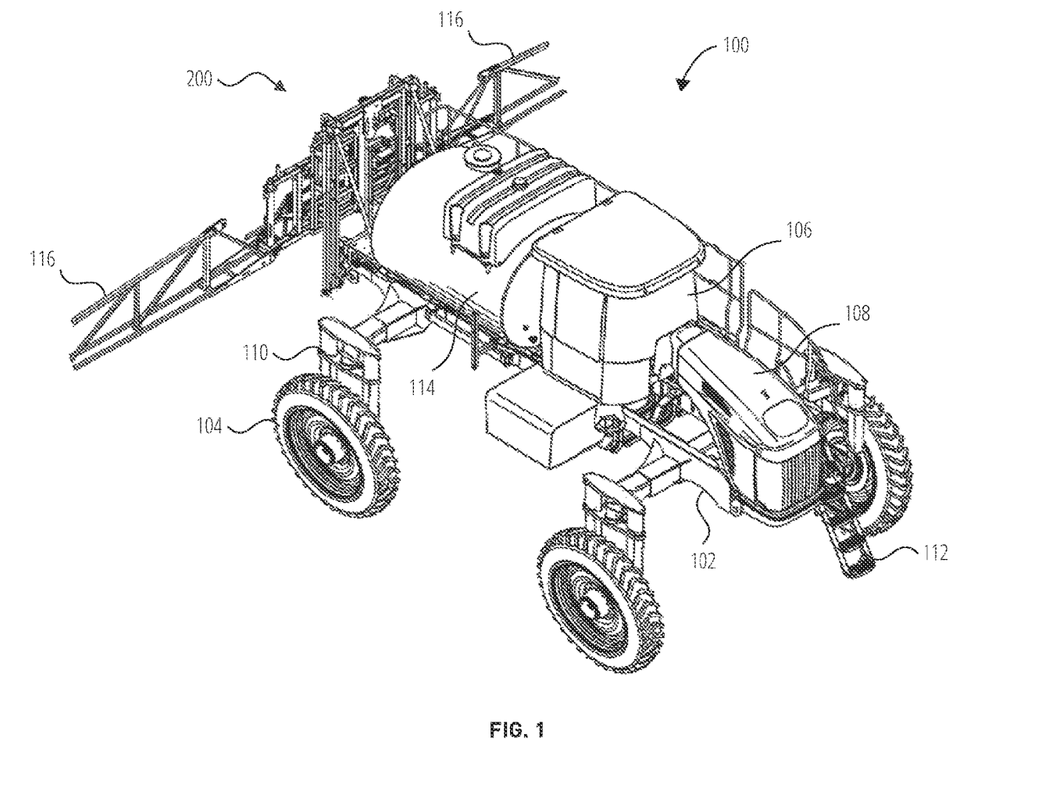
FIG. 1 illustrates an agricultural vehicle in accordance with one embodiment.

FIG. 1 illustrates an agricultural vehicle 100 depicted as vehicle for applying liquids to a field. The agricultural vehicle 100 broadly includes a chassis 102, a plurality of wheels 104 or other ground-engaging elements supporting the chassis 102 above a ground surface, an application system 200, an operator cab 106, and an engine compartment 108, wherein an engine for driving the agricultural vehicle 100 is located. A plurality of suspension modules 110 interposed between the wheels 104 and the chassis 102 support the chassis 102 on the wheels 104 and provide suspension, height adjustment and/or steering functions. A cab access ladder 112 is configured to enable an operator to reach the operator cab 106.

The application system 200 is supported on the chassis 102 and may be, for example, a liquid sprayer system. A reservoir 114 is in fluid connection with the application system 200 and is configured to contain liquid to be applied to the field. The application system 200 includes a pair of lateral booms 116 supporting hoses, pumps and spray nozzles or similar components for dispersing or otherwise applying the contents of the reservoir 114 to a crop (note that outer portions of the lateral booms 116 are omitted from FIG. 1). Alternatively, the application system 200 may be configured to apply dry material to a field and therefore may include a hopper and a mechanism for dispersing particulate material from the hopper, such as a pneumatic spreader or one or more spinners.

The operator cab 106 is supported on the chassis 102 and is typically positioned forward of the application system 200. The operator cab 106 presents a control environment that enables the operator to control the functions of the agricultural vehicle 100, including operating the application system 200.

Figure 2:
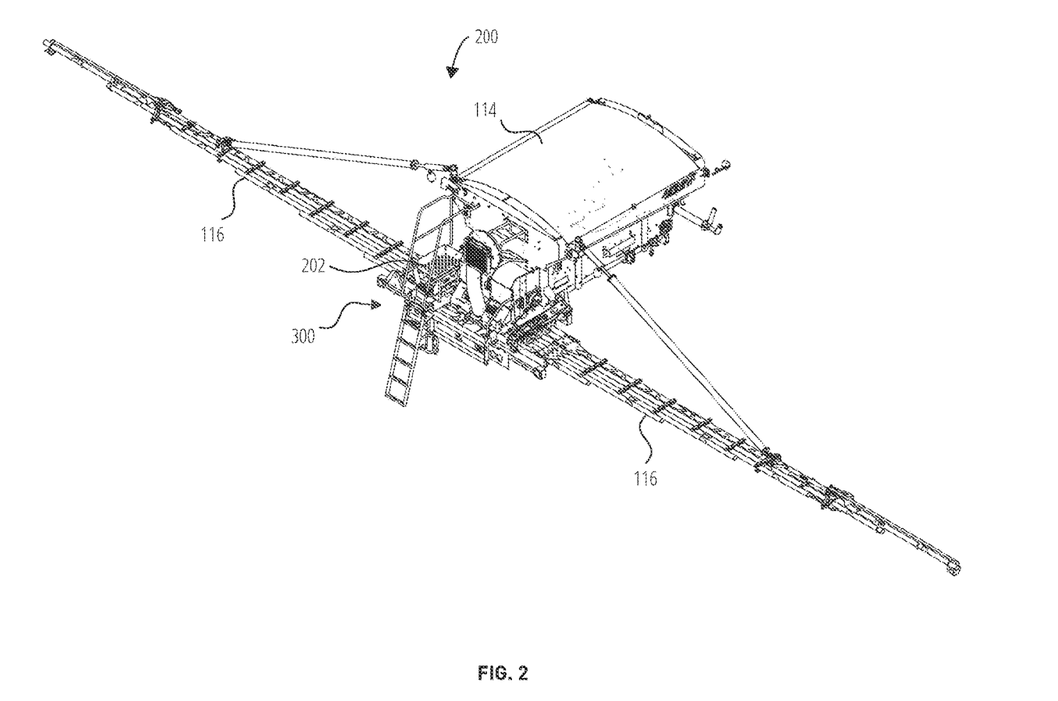
FIG. 2 illustrates a portion of the agricultural vehicle of FIG. 1 including an application system.

FIG. 2 is a rear perspective view of an application system 200 that may be a part of the agricultural vehicle 100 shown in FIG. 1. The lateral booms 116 are shown in an extended position for use applying material to a field. As known in the art, the lateral booms 116 may fold inward for transport. A platform 202 enables an operator to inspect and maintain parts of the application system 200, such as the level of material in the reservoir 114, proper operation of the parts of the application system 200, etc. The operator may occasionally need to access the platform 202 in the field. The operator can use an attached ladder system 300 to climb up to the platform 202. The ladder system 300 may also be used to access other portions of the application system 200.

Figure 3:
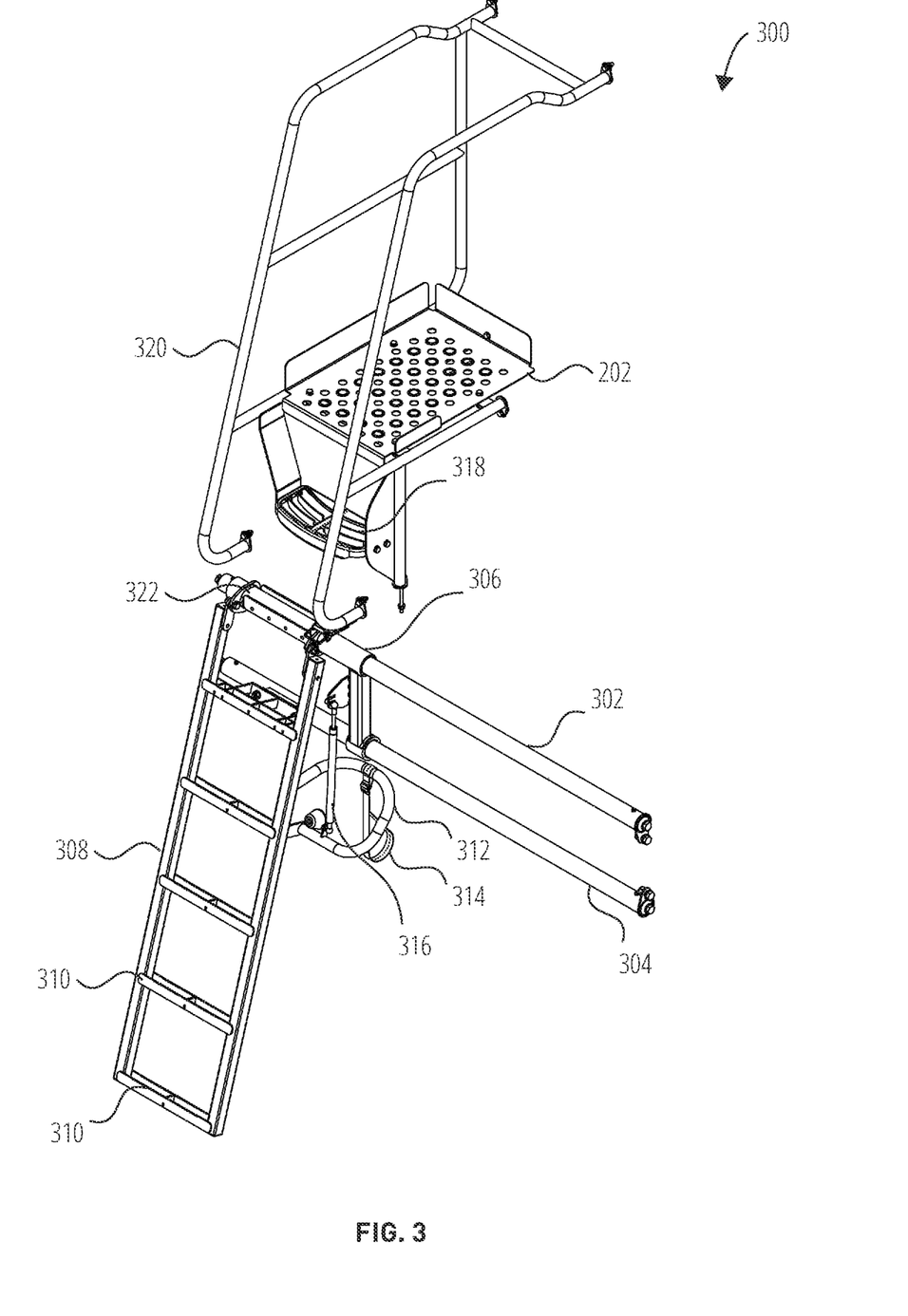
FIG. 3 illustrates a ladder system, in a lowered position, that may be used to access parts of the application system shown in FIG. 2.

FIG. 3 illustrates the ladder system 300 and the platform 202 isolated from the application system 200 for clarity. A first rail 302 and a second rail 304 are arranged parallel to one another, and typically parallel to the ground under the agricultural vehicle 100. A ladder bracket 306 is supported by and configured to slide along the first rail 302 and the second rail 304.

Figure 5:
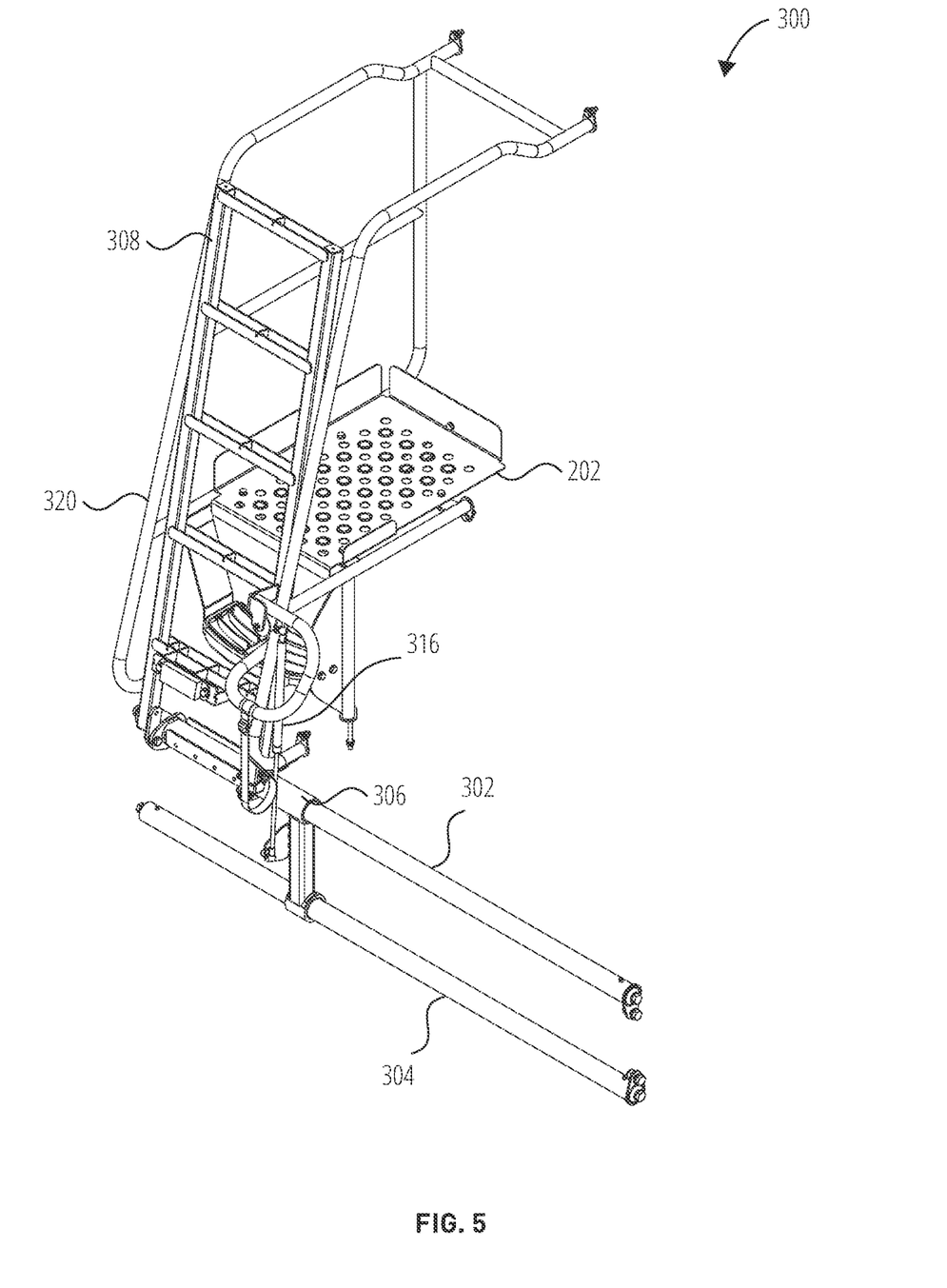
FIG. 5 illustrates the ladder system in a storage position.

A ladder 308 is coupled to the ladder bracket 306 and configured to rotate with respect to the ladder bracket 306 between a lowered position (i.e., the position shown in FIG. 3) and a storage position (shown in FIG. 5). The ladder 308 may be configured to not reach all the way to the ground in the lowered position. Therefore, even if the operator accidentally moves the agricultural vehicle 100 without raising the ladder 308, the ladder system 300 may not sustain any damage if it does not contact the ground.

The ladder 308 includes a plurality of rungs 310 arranged generally in a common plane and a handle 312 extending from the common plane of the rungs 310. The handle 312 may be used by the operator to raise and lower the ladder 308. A strap 314 may also be attached to the handle 312 so that the operator can pull on the handle 312 via the strap 314 when the ladder 308 is in the storage position (i.e., in case the handle 312 is out of reach of the operator).

Figure 4:
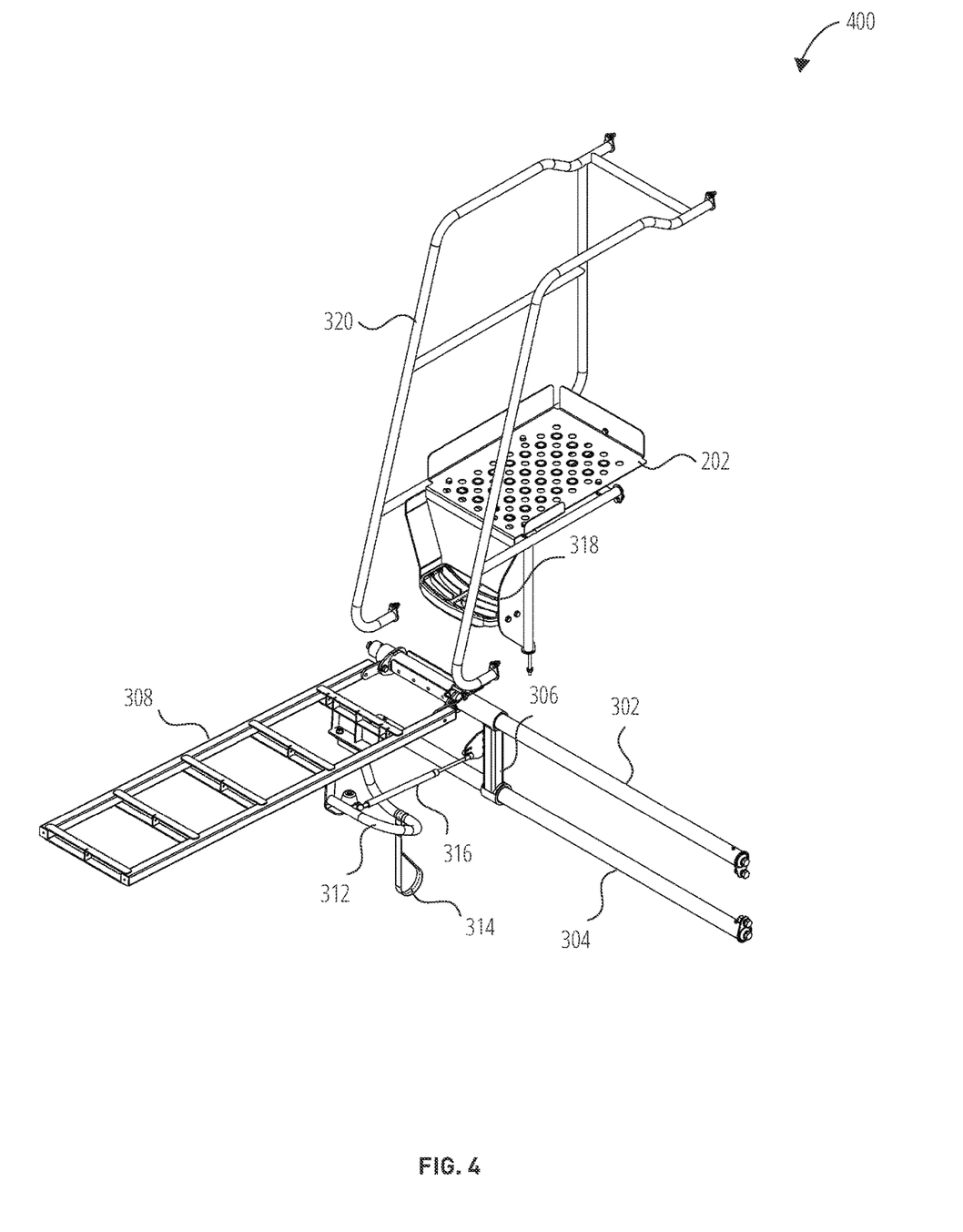
FIG. 4 illustrates the ladder system in an intermediate position.

The ladder system 300 may include an air spring 316 coupling the ladder bracket 306 to the ladder 308. The air spring 316 may apply a force to the ladder 308 when the ladder 308 is in the lowered position to keep the ladder 308 in the lowered position and to keep the ladder 308 from sliding along the first rail 302 and the second rail 304. The air spring 316 may apply a force to the ladder 308 when the ladder 308 is in an intermediate position, as illustrated in FIG. 4 (i.e., between the positions shown in FIG. 3 and FIG. 5) to push the ladder 308 upward, toward the storage position (FIG. 5). Thus, the air spring 316 may provide multiple functions: to keep the ladder 308 down in the lowered position when the ladder 308 is in use, to assist the operator in raising the ladder 308 to the storage position, and to keep the ladder 308 in the storage position when the ladder 308 is not in use.

The ladder bracket 306 and the ladder 308 may slide laterally along the rails 302, 304 when the ladder 308 is in the intermediate position (e.g., as shown in FIG. 4). Therefore, the ladder 308 may be moved to another location along the rails 302, 304 to enable the operator to access different parts of the agricultural vehicle 100.

One or more fixed rungs 318 may be disposed above the first rail 302, and may be fixed with respect to the chassis 102 of the agricultural vehicle 100. The fixed rungs 318 may assist the operator in reaching the platform 202. One or more handrails 320 may be secured to the agricultural vehicle 100 above the first rail 302 for the safety of the operator. Typically, and as shown in FIG. 3, a pair of handrails 320 is used. As shown in FIG. 5, the ladder 308 may be disposed between the handrails 320 when the ladder 308 is in the storage position. The air spring 316 may prevent the ladder 308 from moving out of the storage position on its own, but in some embodiments, the ladder 308 may be further secured in the storage position by a hook, strap, pin, rope, latch, or other device.

Figure 6:
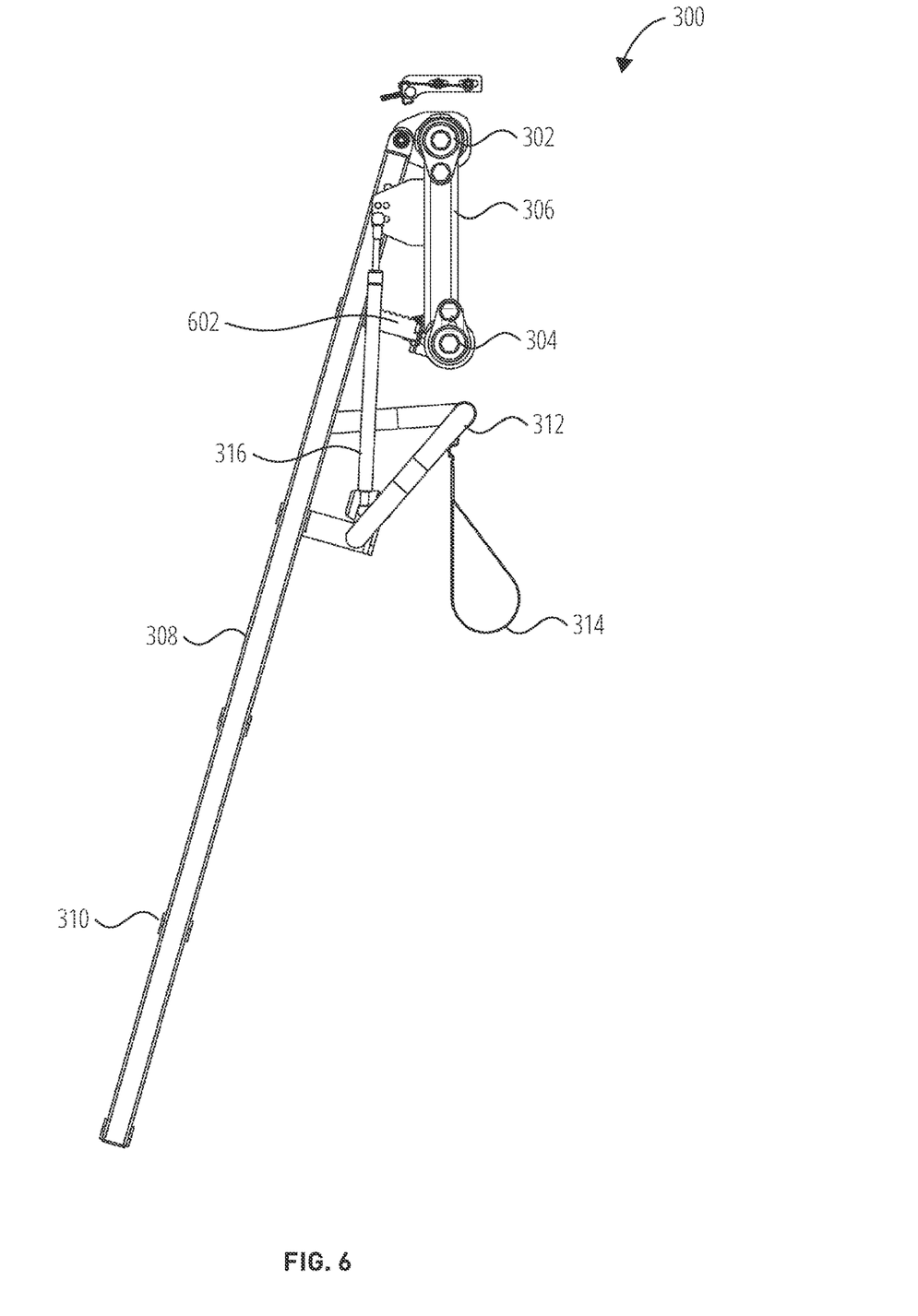
FIG. 6 is a side view of the ladder system shown in FIG. 3.

FIG. 6 is a simplified side view of the ladder system 300 when the ladder 308 is in the lowered position. The ladder 308 may have a bumper 602 arranged such that, when the ladder 308 is in the lowered position, the bumper 602 contacts the second rail 304. In other embodiments, the ladder 308 may contact the chassis 102 or another member that is fixed relative to the chassis 102, as described in more detail below. For example, the bumper 602 may be adjacent one of the rungs 310 of the ladder 308. The bumper 602 may include an elastomeric material or another material to engage the second rail 304 and stabilize the ladder 308 laterally, such that the ladder 308 does not slide along the first rail 302 and the second rail 304 when the ladder 308 is down. Thus, even though the ladder 308 may not extend all the way to the ground, the ladder 308 and ladder bracket 306 may nonetheless be stably supported by the first rail 302 and the second rail 304.

Figure 7:
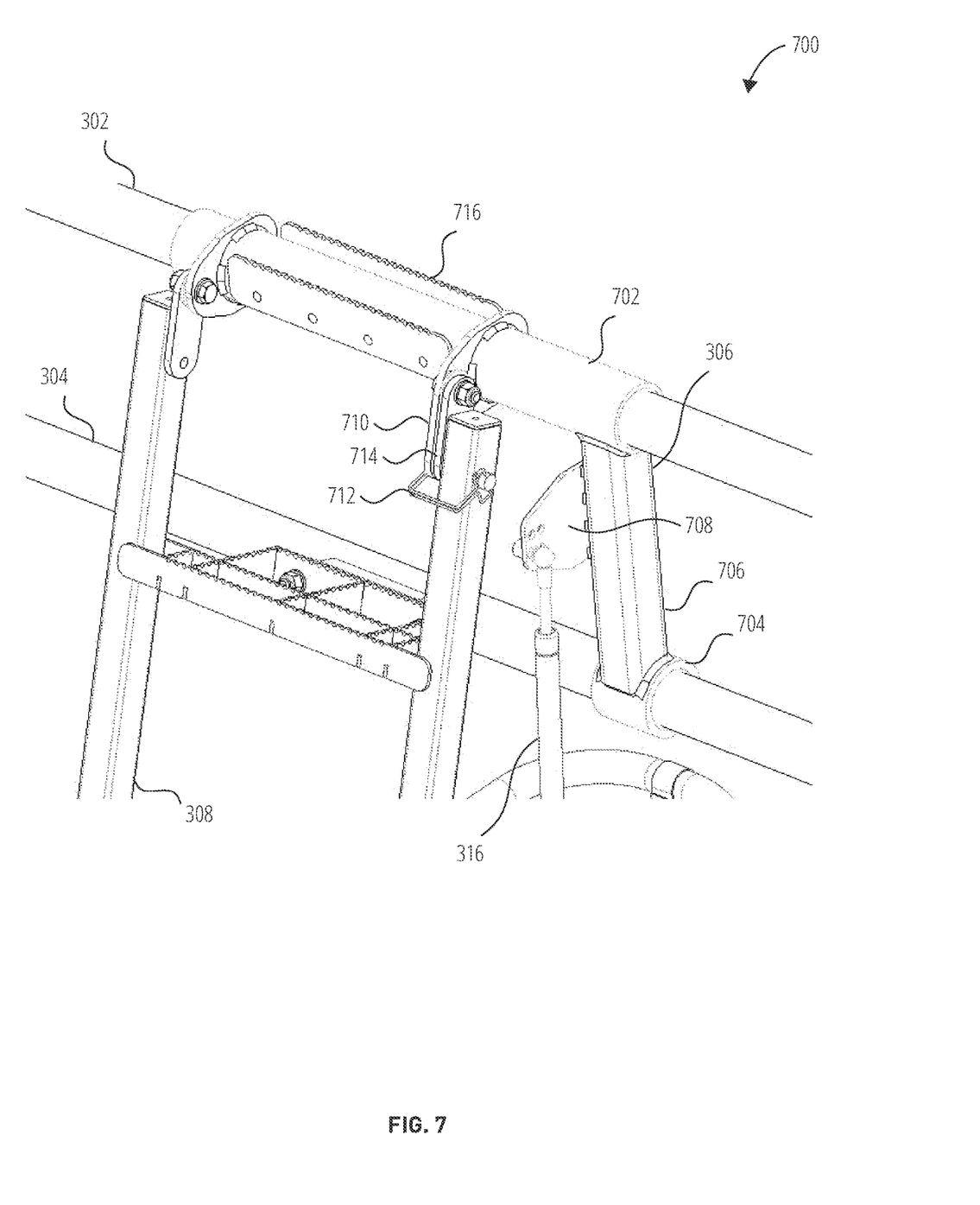
FIG. 7 is a detail view of a portion of the ladder system shown in FIG. 3.

FIG. 7 is a simplified perspective view of the ladder bracket 306 and a portion of the first rail 302, the second rail 304, and the ladder 308.

The ladder bracket 306 may include a first tubular member 702 around the first rail 302 and a second tubular member 704 around the second rail 304. The first tubular member 702 and the second tubular member 704 may be connected to one another by a connecting member 706, such as by welds. In other embodiments, the ladder bracket 306 may be formed as a single unitary member (e.g., by casting, additive manufacturing, etc.). A spring bracket 708 may be secured to the connecting member 706. Rigid connection of the first tubular member 702 to the second tubular member 704 may enable the ladder bracket 306 to slide along the first rail 302 and the second rail 304 without rotating about the rails 302, 304.

The ladder bracket 306 may have greaseless bushings in contact with the rails 302, 304, such that the ladder bracket 306 can slide freely along the rails 302, 304 when the ladder 308 is in the intermediate position (e.g., as shown in FIG. 4).

The ladder bracket 306 may include a fixed hinge element 710 having a hole through which a retaining pin 712 can pass, and the ladder 308 may include a rotating hinge element 714 with a corresponding hole. When the retaining pin 712 is in place, the rotating hinge element 714 of the ladder 308 is locked with respect to the fixed hinge element 710 of the ladder bracket 306. The retaining pin 712 therefore prevents the ladder 308 from rotating upward from the lowered position.

The ladder bracket 306 may also include a rung 716 on the first rail 302 in the form of plates with rough edges or another shape that provides traction for an operator climbing the ladder system 300. Unlike the rungs 310 of the ladder 308, the rung 716 does not rotate with the ladder 308, but may slide along the first rail 302 with the ladder 308.

Figure 8:
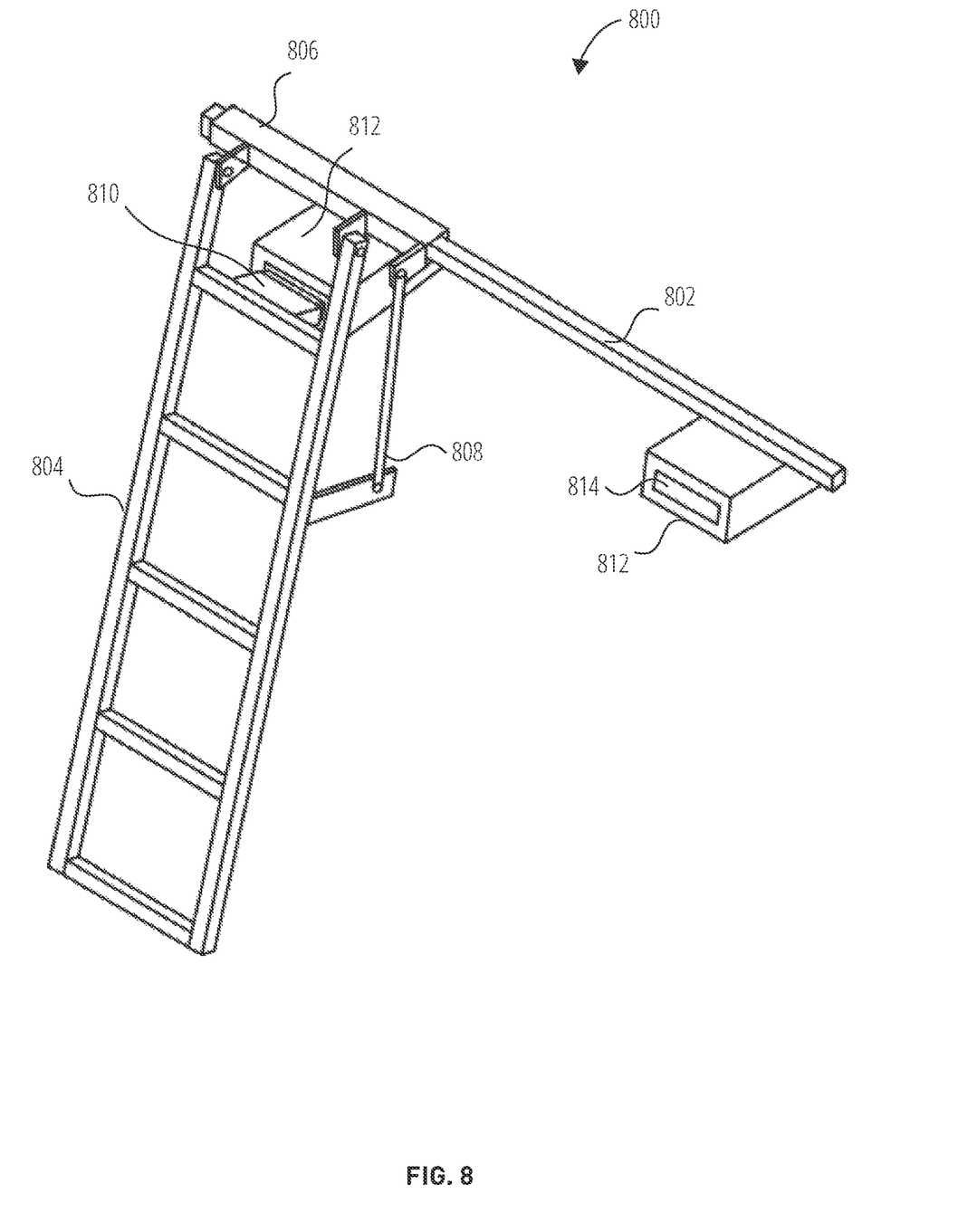
FIG. 8 illustrates a ladder system in accordance with another embodiment.

FIG. 8 is a simplified view of another embodiment of a ladder system 800. The ladder system 800 is similar to the ladder system 300 shown in FIG. 3 through FIG. 7, but includes just one rail 802. A ladder bracket 806 slides along the rail, and a ladder 804 swivels up and down between a lowered position (shown in FIG. 8) and a storage position. The rail 802 has a non-round shape (e.g., a square, a hexagon, a keyway in an otherwise round structure, etc.) to keep the ladder bracket 806 from rotating around the rail 802. A bumper 810 attached to the ladder 804 rests against a bumper stop 812 when the ladder 804 is in the lowered position. The bumper stop 812 may be any surface, such as a structural panel or beam of the agricultural vehicle to which the ladder system 800 is attached, or a part added for the specific purpose of acting as the bumper stop 812. The bumper stop 812 may be fixed relative to the chassis 102 below the rail 802. Another bumper stop 812 may be located below another part of the rail 802 such that the ladder 804 may be supported in another location along the rail 802. Either the bumper 810, the bumper stop 812, or both may include an elastomeric material or any other material to prevent ladder 804 from sliding along the rail 802 when in the lowered position. In some embodiments, the shape of the bumper 810 and the bumper stop 812 may prevent lateral movement of the ladder 804 in the lowered position. For example, the bumper stop 812 may define a recess 814 into which the bumper 810 may extend.

Figure 9:
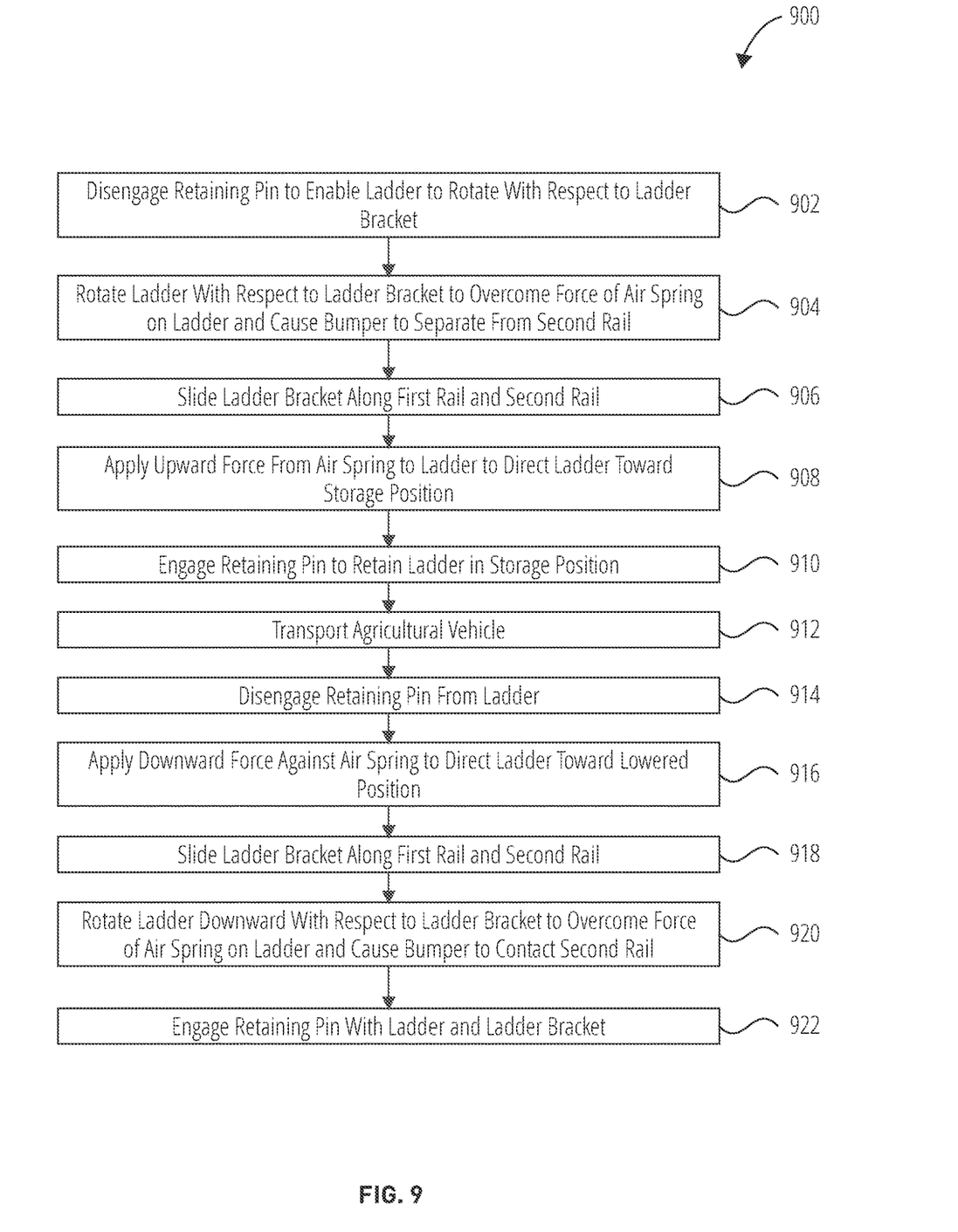
FIG. 9 is a simplified flow chart illustrating a method of operating a ladder system.

FIG. 9 is a simplified flow chart illustrating a method 900 of moving a ladder connected to an agricultural vehicle along a first rail, such as the agricultural vehicle 100 shown in FIG. 1. As shown in block 902 of FIG. 9, a retaining pin may be disengaged to enable the ladder to rotate with respect to a ladder bracket.

In block 904, the ladder is rotated with respect to the ladder bracket to overcome a force of an air spring on the ladder and to cause a bumper to separate from a second rail. In block 906, the ladder bracket slides along the first rail and the second rail. In block 908, an upward force is applied to the ladder by the air spring to direct the ladder toward a storage position. In block 910, the retaining pin is engaged to retain the ladder in the storage position. In block 912, the agricultural vehicle is transported, such as through a field.

In block 914, the retaining pin is disengaged from the ladder. In block 916, a downward force is applied against the air spring to direct the ladder toward a lowered position. In block 918, the ladder bracket slides along the first rail and the second rail. In block 920, the ladder rotates downward with respect to the ladder bracket to overcome a force of the air spring on the ladder and to cause the bumper to contact the second rail. In block 922, the retaining pin engages with the ladder and the ladder bracket.

The actions shown in FIG. 9 and described above need not all be performed, and need not be performed in the order shown. Furthermore, the method 900 may be modified based on the specific elements in a ladder system (e.g., to correspond to the ladder system 800 shown in FIG. 8).

Ladder systems as disclosed herein may provide a convenient means for a person to access a platform on an agricultural vehicle via a vehicle-mounted ladder. Furthermore, because the ladder need not rest on the ground to be stable, the ladder may provide additional safety as compared to conventional ladders. For example, the ladder may be stable even over uneven ground, and failure to stow the ladder before moving the agricultural vehicle may not cause damage to the ladder, the agricultural vehicle, or the field.

Though shown and described along the rear of an agricultural vehicle, the ladder systems may be used in other locations. For example, the cab access ladder 112 shown in FIG. 1 may also incorporate elements disclosed herein. The ladder systems may also be used on other vehicles, such as industrial and construction equipment or any other vehicle on which occasional ladder access is beneficial. Ladder systems as disclosed may also be used in fixed applications, such as in warehouses. For example, rail(s) may be affixed to storage shelving, and a ladder as disclosed may be configured to slide laterally along the rail(s).

Additional non-limiting example embodiments of the disclosure are described below.

Embodiment 1

A ladder system comprising a rail, a ladder bracket supported by and configured to slide along the rail, a ladder coupled to the ladder bracket and configured to rotate with respect to the ladder bracket between a lowered position and a storage position, and an air spring coupling the ladder to the ladder bracket and configured to apply a force to the ladder when the ladder is in the lowered position to keep the ladder in the lowered position and to keep the ladder from sliding along the rail.

Embodiment 2

The ladder system of Embodiment 1, further comprising a bumper coupled to the ladder and configured to contact a member fixed relative to the rail of the ladder system when the ladder is in the lowered position.

Embodiment 3

The ladder system of Embodiment 2, wherein the bumper comprises an elastomeric material.

Embodiment 4

A ladder system comprising a rail, a bumper stop below the rail, a ladder bracket supported by and configured to slide along the rail, a ladder coupled to the ladder bracket and configured to rotate with respect to the ladder bracket between a lowered position and a storage position, a bumper coupled to the ladder, and an air spring coupling the ladder to the ladder bracket and configured to push the bumper against the bumper stop when the ladder is in the lowered position.

Embodiment 5

The ladder system of Embodiment 4, wherein at least one of the bumper and the bumper stop comprises an elastomeric material.

Embodiment 6

The ladder system of Embodiment 4 or Embodiment 5, wherein the bumper stop defines a recess therein, and wherein the air spring is configured to push the bumper into the recess when the ladder is in the lowered position.

Embodiment 7

The ladder system of any one of Embodiment 1 through Embodiment 6, wherein the ladder is configured to rotate to an intermediate position between the lowered position and the storage position, wherein when the ladder is in the intermediate position, the ladder bracket can slide along the rail.

Embodiment 8

The ladder system of any one of Embodiment 1 through Embodiment 7, wherein the ladder bracket comprises at least one greaseless bushing in contact with the rail.

Embodiment 9

The ladder system of any one of Embodiment 1 through Embodiment 8, further comprising a retaining pin configured to lock the ladder to the ladder bracket in the lowered position.

Embodiment 10

The ladder system of any one of Embodiment 1 through Embodiment 9, wherein the ladder comprises a plurality of rungs arranged generally in a common plane and a handle extending from the common plane of the rungs.

Embodiment 11

The ladder system of any one of Embodiment 1 through Embodiment 10, further comprising a strap coupled to the ladder and configured such that, when a tensile force is applied to the strap, the strap pulls the ladder from the storage position.

Embodiment 12

An agricultural vehicle, comprising a chassis supported by a plurality of wheels and the ladder system of any one of Embodiment 1 through Embodiment 11 carried by the chassis.

Embodiment 13

The agricultural vehicle of Embodiment 12, wherein the ladder is configured such that, in the lowered position, the ladder does not reach ground under the wheels of the agricultural vehicle.

Embodiment 14

The agricultural vehicle of Embodiment 12 or Embodiment 13, further comprising a platform above the rail.

Embodiment 15

The agricultural vehicle of any one of Embodiment 12 through Embodiment 14, further comprising at least one fixed rung above the rail, wherein the at least one fixed rung is fixed with respect to the chassis of the agricultural vehicle.

Embodiment 16

The agricultural vehicle of any one of Embodiment 12 through Embodiment 15, further comprising a pair of handrails above the rail, wherein the ladder is disposed between the handrails when the ladder is in the storage position.

Embodiment 17

The agricultural vehicle of and one of Embodiment 12 through Embodiment 16, further comprising an application system comprising a lateral boom extending from the chassis.

Embodiment 18

A method of moving a ladder coupled to a ladder bracket configured to slide along a rail of an agricultural vehicle. The method includes rotating the ladder with respect to the ladder bracket to overcome a force of an air spring on the ladder and to cause a bumper to separate from a point of contact with the agricultural vehicle, applying an upward force from the air spring to the ladder to direct the ladder toward a storage position, and transporting the agricultural vehicle.

Embodiment 19

The method of Embodiment 18, further comprising disengaging a retaining pin to enable the ladder to rotate with respect to the ladder bracket before rotating the ladder.

Embodiment 20

The method of Embodiment 18 or Embodiment 19, further comprising sliding the ladder bracket along the rail.

Embodiment 21

The method of any one of Embodiment 18 through Embodiment 20, further comprising engaging a retaining pin to retain the ladder in the storage position.

Embodiment 22

The method of any one of Embodiment 18 through Embodiment 21, further comprising, after transporting the agricultural vehicle, applying a downward force against the air spring to direct the ladder toward a lowered position, and rotating the ladder downward with respect to the ladder bracket to overcome a force of the air spring on the ladder and to cause the bumper to contact the agricultural vehicle.

Embodiment 23

The method of any one of Embodiment 18 through Embodiment 22, further comprising engaging a retaining pin with the ladder and the ladder bracket to retain the ladder in the lowered position.

Embodiment 24

A method of moving a ladder coupled to a ladder bracket configured to slide along a first rail and a second rail of an agricultural vehicle. The method includes disengaging a retaining pin to enable the ladder to rotate with respect to the ladder bracket, rotating the ladder with respect to the ladder bracket to overcome a force of an air spring on the ladder and to cause a bumper to separate from the second rail, sliding the ladder bracket along the first rail and the second rail, applying an upward force from the air spring to the ladder to direct the ladder toward a storage position, engaging the retaining pin to retain the ladder in the storage position, transporting the agricultural vehicle, disengaging the retaining pin from the ladder, applying a downward force against the air spring to direct the ladder toward a lowered position, sliding the ladder bracket along the first rail and the second rail, rotating the ladder downward with respect to the ladder bracket to overcome a force of the air spring on the ladder and to cause the bumper to contact the second rail, and engaging the retaining pin with the ladder and the ladder bracket.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various vehicle types and configurations.

What is claimed is:
1. A ladder system, comprising:
   a rail;
   a ladder bracket supported by and configured to slide along the rail;
   a ladder coupled to the ladder bracket and configured to rotate with respect to the ladder bracket between a lowered position and a storage position; and a bumper coupled to the ladder and configured to apply a force to a bumper stop when the ladder is in the lowered position to keep the ladder bracket from sliding along the rail.

2. The ladder system of claim 1, wherein the ladder is configured to rotate to an intermediate position between the lowered position and the storage position, wherein when the ladder is in the intermediate position, the ladder bracket can slide along the rail.

3. The ladder system of claim 1, wherein the ladder bracket comprises at least one greaseless bushing in contact with the rail.

4. The ladder system of claim 1, further comprising a retaining pin configured to lock the ladder to the ladder bracket in the lowered position.

5. The ladder system of claim 1, wherein the ladder comprises a plurality of rungs arranged generally in a common plane and a handle extending from the common plane of the rungs.

6. The ladder system of claim 5, further comprising a strap attached to the handle.

7. The ladder system of claim 1, further comprising a second rail parallel to the rail.

8. The ladder system of claim 1, wherein the bumper comprises an elastomeric material.

9. An agricultural vehicle, comprising:
a chassis supported by a plurality of wheels; and
a ladder system carried by the chassis, the ladder system comprising:
a rail fixed with respect to the chassis;
a ladder bracket supported by and configured to slide along the rail;
a ladder coupled to the ladder bracket and configured to rotate with respect to the ladder bracket between a lowered position and a storage position; and
a bumper coupled to the ladder and configured to apply a force to a bumper stop when the ladder is in the lowered position to keep the ladder bracket from sliding along the rail.

10. The agricultural vehicle of claim 9, wherein the ladder is configured such that, in the lowered position, the ladder does not reach ground under the wheels of the agricultural vehicle.

11. The agricultural vehicle of claim 9, further comprising a platform above the rail.

12. The agricultural vehicle of claim 9, further comprising at least one fixed rung above the rail, wherein the at least one fixed rung is fixed with respect to the chassis of the agricultural vehicle.

13. The agricultural vehicle of claim 9, further comprising a pair of handrails above the rail, wherein the ladder is disposed between the handrails when the ladder is in the storage position.

14. The agricultural vehicle of claim 9, further comprising an application system comprising a lateral boom extending from the chassis.

15. A method of moving a ladder coupled to a ladder bracket configured to slide along a rail of an agricultural vehicle, the method comprising:
applying an upward force to the ladder to rotate the ladder with respect to the ladder bracket and to cause a bumper to separate from a point of contact with the agricultural vehicle;
sliding the ladder bracket along the rail;
directing the ladder to a storage position; and
transporting the agricultural vehicle.

16. The method of claim 15, further comprising disengaging a retaining pin to enable the ladder to rotate with respect to the ladder bracket before applying the upward force to the ladder.

17. The method of claim 15, further comprising engaging a retaining pin to retain the ladder in the storage position.

18. The method of claim 15, further comprising, after transporting the agricultural vehicle:
directing the ladder toward a lowered position; and
sliding the ladder bracket along the rail before the ladder reaches a lowered position in which the bumper contacts the agricultural vehicle.

19. The method of claim 18, further comprising engaging a retaining pin to retain the ladder in the lowered position.

20. The method of claim 18, further comprising compressing the bumper against the agricultural vehicle.

* * * * *